3,134,743
STABILIZED CHLOROETHYLENE POLYMER COMPOSITIONS CONTAINING AN EMULSIFIER AND A DERIVATIVE OF AN ALKYLENE DIAMINE TETRAACETIC ACID
Charles E. Haberman, Rifle, Colo., assignor to The Dow Chemical Company, Midland, Mich., a corporation of Delaware
No Drawing. Filed July 1, 1960, Ser. No. 40,198
6 Claims. (Cl. 260—23)

This invention concerns improvements in chloroethylenic polymer compositions and, more particularly, concerns the thermal stability of films and other products made therefrom.

It is well known that chlorine containing polymer compositions such as the molded parts and films formed therefrom are quite unstable toward heat. These polymers suffer a loss of the HCl which become particularly severe as the temperature of the polymer is raised above normal. The resulting degradation yields dark colored composition products causing initially clear or white polymer containing products to darken to yellow, orange, tan, and brown hues.

In the United States Patent No. 2,558,728, issued July 3, 1951, to Britton and Le Fevre; it is suggested that the thermal stability of vinylidene chloride polymers can be improved with ethylene dimaine N,N¹-tetraacetic acid and its alkali metal and alkaline earth metal salts. Similarly, in United States Patent No. 2,724,706, issued November 22, 1955, to Bersworth; it is suggested that the heat stability of vinyl resins can be improved with the lead, cadmium, tin, and zinc compounds of the alkylene polyamine polyacetic acids.

It is an object of this invention to improve upon these latter suggestions and to further improve the heat stability of chloroethylenic polymer compositions.

I have now found that the foregoing and related objects can be obtained in a stabilized composition of a chloroethylenic polymer containing about 0.5–5 percent of an anionic emulsifier and about 0.5–5 percent of a derivative of an alkylene diamine tetraacetic acid wherein the alkylene radical contains from 1 to 4 carbon atoms.

The essence of the invention lies in the discovery of a synergistic stabilizing action between the anionic emulsifier and the alkylene diamine tetraacetic acid derivative. Experimental conditions which cause chlorethylenic polymers, stabilized with one of these materials, to change from colorless to dark brown or black in 5–10 minutes have relatively little effect when both stabilizers are present.

The anionic emulsifier stabilizer can be selected from any of this well known class of compounds. Among those used successfully in the composition of the present invention are the dioctyl ester of sodium sulfosuccinic acid, sodium lauryl sulfate, mixed fatty alcohol sodium sulfate, fatty alcohol amine sulfate sodium salt of dodecyl benzenesulfonic acid, sodium salt of carboxylated polyelectrolyte, sodium sulfate derivative of 7-ethyl-2-methyl-undecanol-4, and alkyl benzene sodium sulfonate. These compounds are effective in the range of about 0.5–5 percent of the polymer but a percentage of about 3–4 percent appears to be the optimum concentration.

The second stabilizer also comes from a well known class of compounds, the derivatives of alkylene diamine tetraacetic acid wherein the alkylene radical contains from 1 to 4 carbon atoms. Prominent among these derivatives are the alkali metal and alkaline earth metal salts as mentioned in the Britton and Le Fevre reference cited previously. Of this group of derivatives the disodium, trisodium and tetrasodium salts of ethylene diamine tetraacetic acid are preferred. Also preferred is ethylene diamine tetraacetic acid.

Another type of derivative is formed by a substitution for one of the acid radicals of the alkylene diamine tetraacetic acids. The substitution of a hydroxyl radical leads to an effective group of stabilizers among which N-hydroxyethylene diamine triacetic acid-trisodium salt is especially favored.

The alkylene diamine tetraacetic acid derivative stabilizers are effective in the proportion of about 0.5–5 percent of the polymer but a percentage of about 2–3 percent appears to be the optimum concentration.

The unstable polymeric material adapted to be used in the compositions of the invention comprises any chloroethylenic polymer. This includes, in particular, homopolymers of vinyl chloride and vinylidene chloride as well as copolymers and other interpolymers of vinyl chloride and/or vinylidene chloride with other ethylenic unsaturated comonomers such as vinyl acetate; acrylonitrile; vinyl propionate; the alkyl, cycloalkyl, and aryl acrylates; and the like. The polymeric material also includes blends of a chloroethylenic polymer or copolymer with a nonchlorine containing polymer or copolymer. Degradation of relatively small portions of chloroethylenic polymers can affect significantly relatively large portions of other polymers associated therewith.

EXAMPLE 1

A number of 100 grams samples of a coagulated and dried latex of an 85 percent vinyl chloride–15 percent vinyl propionate copolymer were prepared. One control sample contained 2 grams of N-hydroxyethylene diamine triacetic acid-trisodium salt and no anionic emulsifying agent. A second control sample contained 3 grams of an alkyl benzene sodium sulfonate and no alkylene polyamine compound. The remaining samples each contained 3 grams of the octyl benzene sodium sulfonate and 2 grams of one of the following: N-hydroxyethylene diamine triacetic acid-trisodium salt, ethylene diamine N,N¹-tetraacetic acid, ethylene diamine N,N¹-tetraacetic acid-disodium salt, ethylene diamine N,N¹-tetraacetic acid-trisodium salt, and ethylene diamine N,N¹-tetraacetic acid-tetrasodium salt.

After thorough blending of each sample, the mixture was molded into a sample of uniform thickness (about 0.06 inch). Each of the samples was heated at 175° C. for various lengths of time up to 15 minutes. The degree of thermal decomposition was judged by the darkening of the samples and this was expressed in terms of an arbitrary scale from 1 to 10 where 1 represents a colorless product and 10 represents a black or very dark brown product. The comparison between the different degrees of darkening of the sample at various times was as follows:

Table 1

| Sample | Minutes at 175° C. | | | |
|---|---|---|---|---|
| | 0 | 5 | 10 | 15 |
| Control with N-hydroxyethylene diamine triacetic acid-trisodium salt | 1 | 9 | 10 | 10 |
| Control with alkylbenzene sodium sulfonate | 1 | 6 | 8 | 10 |
| Sulfonate+N-hydroxyethylene diamine triacetic acid-trisodium salt | 1 | 1 | 2 | 2 |
| Sulfonate+ethylene diamine N, N¹-tetraacetic acid | 1 | 2 | 3 | 4 |
| Sulfonate+ethylene diamine N,N¹-tetraacetic acid-disodium salt | 1 | 2 | 3 | 3 |
| Sulfonate+ethylene diamine N,N¹-tetraacetic acid-trisodium salt | 1 | 2 | 2 | 3 |
| Sulfonate+ethylene diamine N-N¹-tetraacetic acid tetrasodium salt | 1 | 2 | 3 | 3 |

EXAMPLE 2

Samples similar to those of Example 1 were prepared and tested except that 8 of the samples each contained 3 percent of an anionic emulsifier and no alkylene diamine compound (Table 2) while another corresponding group of 8 samples each contained 3 percent of an anionic emulsifier plus 2 grams of N-hydroxyethylene diamine-triacetic acid-trisodium salt (Table 3).

Table 2

| Sample+Anionic Emulsifier | Minutes at 175° C. | | | |
|---|---|---|---|---|
| | 0 | 5 | 10 | 15 |
| Dioctyl ester of sodium sulfosuccinic acid | 1 | 7 | 9 | 10 |
| Sodium lauryl sulfate | 2 | 8 | 10 | 10 |
| Mixed fatty alcohol sodium sulfate | 1 | 8 | 9 | 10 |
| Fatty alcohol amine sulfate | 2 | 8 | 9 | 10 |
| Sodium salt of dodecyl benzenesulfonic acid | 2 | 9 | 10 | 10 |
| Sodium salt of carboxylated polyelectrolyte | 2 | 8 | 10 | 10 |
| Sodium sulfate derivative of 7-ethyl-2-methylundecanol-4 | 1 | 7 | 8 | 10 |
| Alkyl benzene sodium sulfonate | 1 | 6 | 8 | 10 |

Table 3

| Sample | Minutes at 175° C. | | | |
|---|---|---|---|---|
| | 0 | 5 | 10 | 15 |
| All with N-hydroxyethylene diamine triacetic acid-trisodium salt plus— | | | | |
| Dioctyl ester of sodium sulfosuccinic acid | 1 | 1 | 2 | 3 |
| Sodium lauryl sulfate | 1 | 2 | 2 | 3 |
| Mixed fatty alcohol sodium sulfate | 1 | 1 | 2 | 2 |
| Fatty alcohol amine sulfate | 1 | 2 | 3 | 3 |
| Sodium salt of dodecyl benzene-sulfonic acid | 1 | 2 | 3 | 4 |
| Sodium salt of carboxylated polyelectrolyte | 1 | 2 | 3 | 4 |
| Sodium sulfate derivative of 7-ethyl-2-methylundecanol-4 | 1 | 2 | 3 | 3 |
| Alkyl benzene sodium sulfonate | 1 | 1 | 2 | 2 |

EXAMPLE 3

Samples similar to those of Example 1 were prepared and tested except that a group of 4 samples comprised respectively; a vinyl chloride-methyl acrylate copolymer, a vinyl chloride-methyl methacrylate copolymer, a vinyl chloride-ethyl acrylate copolymer, and a vinyl chloride-vinylidene chloride copolymer. Each of these samples contained 2 percent N-hydroxyethylene diamine triacetic acid-trisodium salt and no anionic emulsifier (Table 4). A second group of 4 samples were prepared each containing one of the copolymers, the N-hydroxyethylene diamine triacetic acid-trisodium salt, and 3 percent of a mixed fatty alcohol sodium sulfate (Table 5).

Table 4

| Sample | Minutes at 175° C. | | | |
|---|---|---|---|---|
| | 0 | 5 | 10 | 15 |
| All with N-hydroxyethylene diamine triacetic acid-trisodium salt: | | | | |
| Vinyl chloride-ethyl acrylate | 1 | 7 | 9 | 10 |
| Vinyl chloride-methyl acrylate | 2 | 9 | 10 | 10 |
| Vinyl chloride-methyl methacrylate | 1 | 7 | 9 | 10 |
| Vinyl chloride-vinylidene chloride | 2 | 8 | 10 | 10 |

Table 5

| Sample | Minutes at 175° C. | | | |
|---|---|---|---|---|
| | 0 | 5 | 10 | 15 |
| All with N-hydroxyethylene diamine triacetic acid-trisodium salt plus a mixed fatty alcohol sodium sulfate: | | | | |
| Vinyl chloride-ethyl acrylate | 1 | 1 | 1 | 2 |
| Vinyl chloride-methyl acrylate | 1 | 2 | 4 | 6 |
| Vinyl chloride-methyl methacrylate | 1 | 1 | 1 | 2 |
| Vinyl chloride-vinylidene chloride | 1 | 3 | 4 | 6 |

The foregoing examples were repeated using various proportions of a variety of the anionic emulsifier stabilizers and various proportions of a variety of alkylene diamine tetraacetic acid derivatives. The examples were also repeated using stabilized molded forms and films formed from a variety of polymers of vinyl chloride and vinylidene chloride as well as copolymers of these materials with vinyl propionate, vinyl acetate, acrylonitrile, methyl acrylate, ethyl acrylate and methyl methacrylate. Results comparable with those reported in the foregoing examples were obtained.

I claim:

1. A stabilized composition of a vinyl chloride-vinylidene chloride copolymer containing about 3–4 percent of an emulsifier and about 2–3 percent of a derivative of an alkylene diamine tetraacetic acid wherein said emulsifier is selected from the class of anionic emulsifiers consisting of the dioctyl ester of sodium sulfosuccinic acid, sodium lauryl sulfate, mixed fatty alcohol sodium sulfate, fatty alcohol amine sulfate, sodium salt of dodecyl benzenesulfonic acid, sodium salt of carboxylated polyelectrolyte, sodium sulfate derivative of 7-ethyl-2-methylundecanol-4, and alkyl benzene sodium sulfonate; wherein said alkylene radical contains from 1 to 4 carbon atoms; and wherein said derivative is selected from the alkali metal salts of, alkaline earth metal salts of, and hydroxyl substituted alkylene diamine tetraacetic acid.

2. The composition according to claim 1 wherein the derivative is N-hydroxyethylene diamine triacetic acid-trisodium salt.

3. The composition according to claim 1 wherein the derivative is ethylene diamine N,N[1]-tetraacetic acid.

4. The composition according to claim 1 wherein the derivative is ethylene diamine N,N[1]-tetraacetic acid-disodium salt.

5. The composition according to claim 1 wherein the derivative is ethylene diamine N,N[1]-tetraacetic acid-trisodium salt.

6. The composition according to claim 1 wherein the derivative is ethylene diamine N,N[1]-tetraacetic acid-tetrasodium salt.

References Cited in the file of this patent
UNITED STATES PATENTS

| | | |
|---|---|---|
| 2,404,781 | Arnold et al. | July 30, 1946 |
| 2,413,856 | Bersworth | Jan. 7, 1947 |
| 2,462,422 | Plambeck | Feb. 22, 1949 |
| 2,558,728 | Britton et al. | July 3, 1951 |
| 2,724,706 | Bersworth | Nov. 22, 1955 |
| 2,802,816 | Asseff et al. | Aug. 13, 1957 |
| 2,960,491 | Isaacs et al. | Nov. 15, 1960 |